United States Patent [19]

Quinn

[11] Patent Number: 5,412,886
[45] Date of Patent: May 9, 1995

[54] CALENDAR ORIENTED MONTHLY BILL PAYMENT SORTER

[76] Inventor: Maureen T. Quinn, 1408 Tulip Ct., Apt. B1, Wheeling, Ill. 60090

[21] Appl. No.: 36,479

[22] Filed: Mar. 24, 1993

[51] Int. Cl.⁶ .......................... G09D 3/02; B42D 5/04
[52] U.S. Cl. ........................ 40/119; 40/122; 40/124.2; 40/537; 283/2; 283/3
[58] Field of Search ................ 40/119, 122, 124.2, 40/159, 537; 283/2, 3

[56] References Cited

U.S. PATENT DOCUMENTS

| | | | |
|---|---|---|---|
| 384,526 | 6/1888 | Isbell | 40/122 |
| 1,764,236 | 6/1930 | Abbott | 40/121 |
| 2,574,899 | 11/1951 | Waring | 40/119 |
| 2,791,446 | 5/1957 | Hilsinger | 40/119 |
| 2,828,567 | 4/1958 | Shoan | 40/124.2 |
| 2,832,389 | 4/1958 | Smith | 383/9 |
| 2,838,862 | 6/1958 | McConnel | 40/124.2 |
| 2,892,275 | 6/1959 | Woofter | 40/122 |
| 3,012,348 | 12/1961 | Smith | 40/124.2 |
| 3,057,473 | 10/1962 | Stern et al. | 206/464 |
| 3,099,352 | 7/1963 | Aven | 40/107 |
| 3,195,253 | 7/1965 | White | 40/119 |
| 3,207,421 | 9/1965 | Hunger et al. | 40/107 |
| 3,534,489 | 10/1970 | Diambra et al. | 40/122 |
| 3,983,649 | 10/1976 | Ellis et al. | 40/122 |
| 4,750,281 | 6/1988 | Magdovitz | 40/124.2 |
| 4,860,468 | 8/1989 | Cliborn | 40/159 |
| 4,905,388 | 3/1990 | Sinkow | 40/110 |
| 4,975,061 | 12/1990 | Avrill | 434/304 |
| 5,015,319 | 5/1991 | Wilen | 40/537 |
| 5,214,869 | 6/1993 | Wilen | 40/122 |

FOREIGN PATENT DOCUMENTS

| | | | |
|---|---|---|---|
| 546177 | 9/1957 | Canada | 40/119 |
| 315135 | 7/1956 | Switzerland | 40/119 |
| 512386 | 9/1939 | United Kingdom | 40/122 |

Primary Examiner—Richard A. Bertsch
Assistant Examiner—Howard R. Richman
Attorney, Agent, or Firm—Allegretti & Witcoff, Ltd.

[57] ABSTRACT

A calendar and mail sorting structure which includes a series of monthly calendar sheets joined to a bottom sheet member by a binding along top edges of the sheets and with the sheets being rotatable on the binding enabling each sheet to be successively rotated into a front viewing position. Each of the sheets have a series of rows of slots. Indicia is mounted on front sides of the calendar sheets in adjacency to the slots for viewing when each sheet is successively rotated into the front viewing position at a front side of the calendar. Mail supports are mounted on the calendar and mail supporting structure between the bottom sheet member and the current monthly calendar sheet for supporting mail from behind the current monthly sheet when mail is inserted through the slots from a front viewing position of the current monthly calendar sheet while leaving a part of the mail protruding from the slot at a front side of the current monthly calendar sheet.

21 Claims, 3 Drawing Sheets

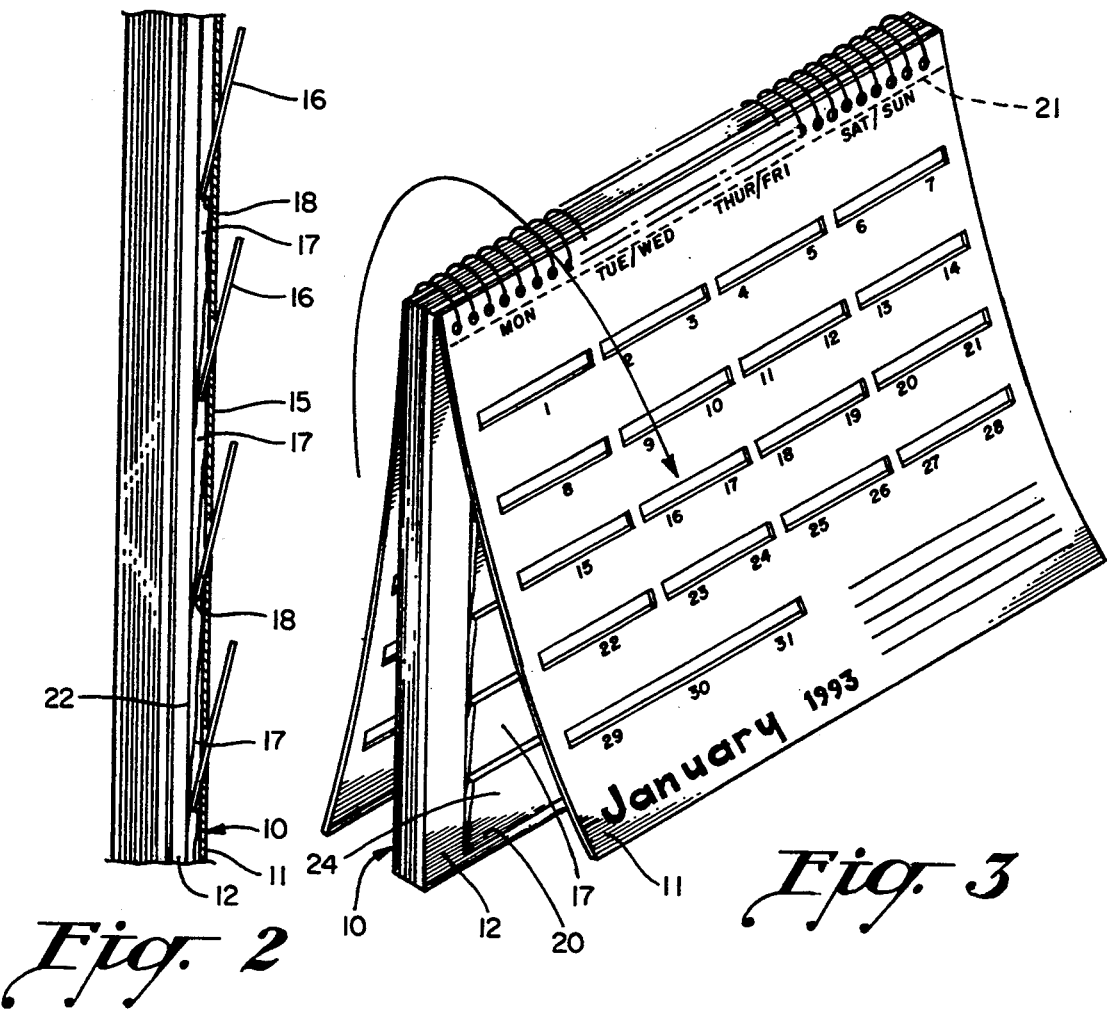
Fig. 2
Fig. 3
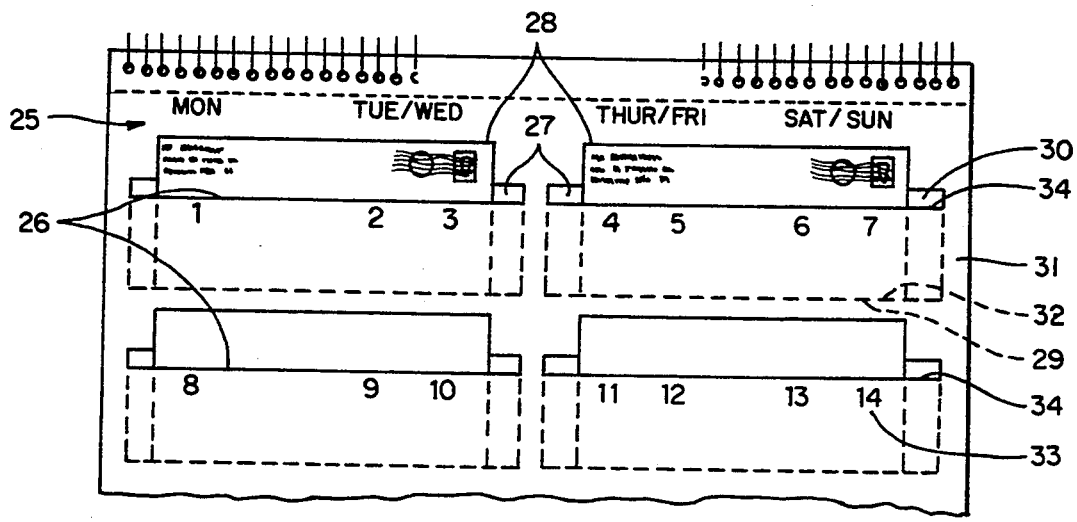
Fig. 4

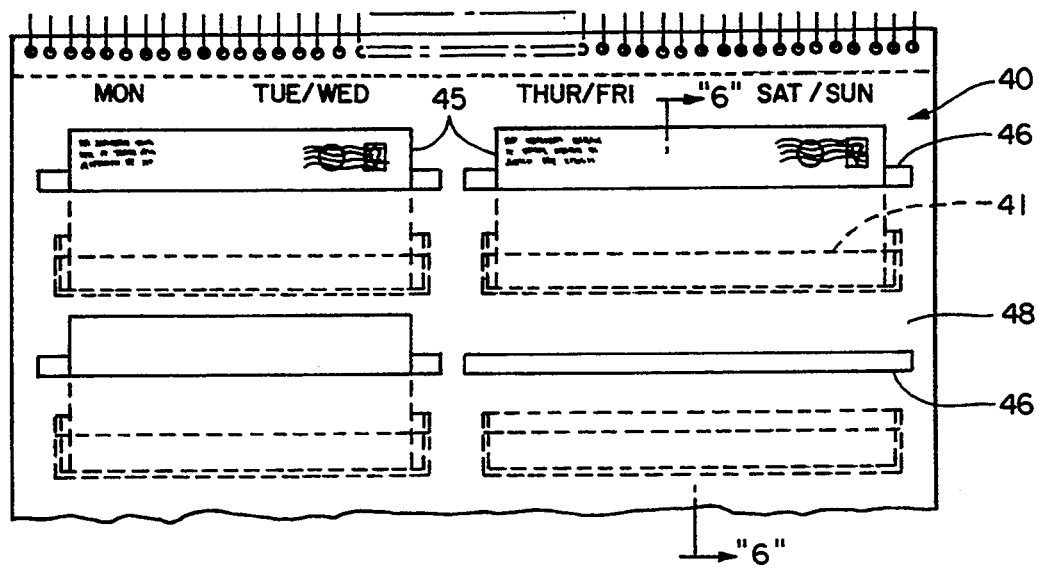
Fig. 5
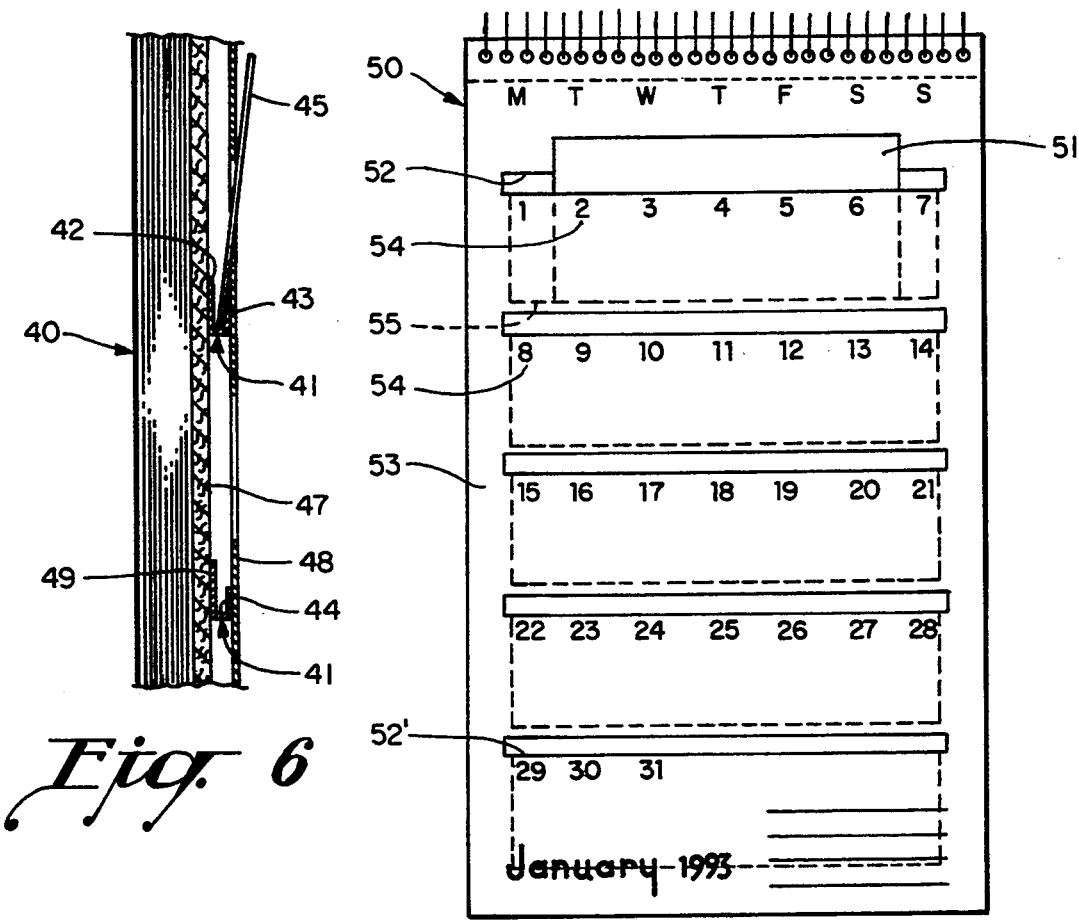
Fig. 6
Fig. 7

CALENDAR ORIENTED MONTHLY BILL PAYMENT SORTER

BACKGROUND OF THE INVENTION

FIELD OF THE INVENTION

The present invention concerns a new calendar and mail sorting structure which is adapted to be mounted on a wall in a home or office as may be required. The calendar and mail sorting structure is believed to be an improvement over the state of the art in that it enables a user to schedule bill payments so that bills or appointments can be conveniently scheduled at a point in time when payment should be made or when the appointment is scheduled. One big advantage of my calendar and mail sorting structure is that it is economical to manufacture and easy to use and it provides a ready way for bills to be paid a few days before they are due so that the user does not need to refer to the details of the bill but merely needs to put them in a sorting slot for payment a few days before they are due. This mail supporting structure can also be helpful to a user to enable more costly payments to be paid by mailing a payment close to the time when due to maintain cash levels as high as possible in a user's checking account.

With my unique construction for my calendar and mail sorting structure I have provided slots with indicia indicating calendar dates in immediate proximity to each of the slots. Behind the slots and slightly beneath the slots I have further provided envelope support means which in one form of my invention comprises light weight open ended bags where the open ends are immediately beneath the slot associated therewith so that an envelope can be pushed through the slot into the bag. The bottom of the bag is so oriented with respect to the slot that when the envelope strikes the bottom of the bag the envelope will protrude upwardly through the slot on a front face of the calendar so that it can be readily manually removed when it is desired to mail the envelope. In another form of my invention, I have provided a ledge rather than a bag which ledge functions in the same manner as the bag to support a bottom or lower edge of the envelope after it has been inserted in this slot leaving an upper end of the envelope protruding above the slot exteriorly of the front face of the monthly calendar sheet as just described.

SUMMARY OF THE INVENTION

According to important features of my invention, I have provided a calendar and mail sorting structure including a series of monthly calendar sheets joined to a bottom sheet member by a binding along top edges of the sheets and with the sheets being rotatable on the binding enabling each sheet to be successively rotated into a front viewing position, the improvement of each of the sheets having a series of rows of slots, indicia mounted on front sides of the calendar sheets in adjacency to the slots for viewing when each sheet is successively rotated into the front viewing position at a front side of the calendar, and mail supporting means mounted on the calendar and mail supporting structure between the bottom sheet member and the current monthly calendar sheet for supporting mail from behind the current monthly sheet when mail is inserted through said slots from a front viewing position of the current monthly calendar sheet.

Other features of my calendar and mail sorting structure relate to the score lines being provided along a top edge of each of the sheets in adjacency to the binding for enabling the sheets to be easily severed from the binding.

Still other features of my invention relate to the indicia provided on the front side of each of the calendar sheets being oriented relative to the slots in each row so that at least two days of each week are noted by indicia beneath each of the slots in each of the rows.

Yet other features of my calendar and mail sorting structure relate to a slit being provided at a bottom corner of each sheet, and a envelope retaining receptacle having an upper open end located behind a back side of the sheet with the open end being in adjacency to the elongated slit for receiving envelopes for storing them for the succeeding month.

Other and still further features relate to a series of vertically spaced horizontal lines being provided at a bottom corner of each of the sheets and beneath the slots for receipt of notes to be written by a user of the calendar and mail sorting structure.

Another feature relates to the mail supporting means comprising a series of bags of a light weight material each having an upper open end located just beneath an associated one of the slots for receiving mail as it is manually inserted through the slot and then supported in the bag beneath the slot at a rear side of the monthly calendar sheet that is located at the front side of the bottom sheet member, the bag being sized to permit a portion of each envelope to remain on the front side of the front sheet for ready removal.

Further and other features relate to the mail supporting means comprising a ledge located between the bottom sheet member and the monthly calendar sheet being positioned on a front side of the bottom sheet member thereof enabling mail to be sorted and extended through one or more of the slots, the ledge being positioned to permit a portion of each envelope to remain on the front side of the front sheet for ready removal.

Another and still further feature relates to the rows of slots being vertically and horizontally oriented so that the rows of slots cover the transverse and horizontal extent of the monthly calendar sheet.

Additional objects, advantages, and features of the present invention will become apparent from the following description and appended claims, taken in conjunction with the accompanying drawings.

BRIEF DESCRIPTION OF THE DRAWINGS

FIG. 2 is an enlarged fragmentary view taken on the line 2—2 looking in the direction indicated by the arrows;

FIG. 3 is a perspective view of the calendar and mail sorting structure shown in FIG. 1 indicating by an arrow how calendar sheets can be rotated on a binding for positioning a new monthly sheet;

FIG. 4 is an fragmentary front elevation of a modified type of a calendar and mail sorting structure embodying other features of my invention;

FIG. 5 is an fragmentary front elevation of still another modified type of a calendar and mail sorting structure according to my invention;

FIG. 6 is an enlarged fragmentary partially sectional view taken on the line 6—6 looking in the direction indicated by the arrows as seen in FIG. 5; and FIG. 7 is a front view of still another modified calendar and mail sorting structure.

DESCRIPTION OF THE PREFERRED EMBODIMENT

Figure 1:
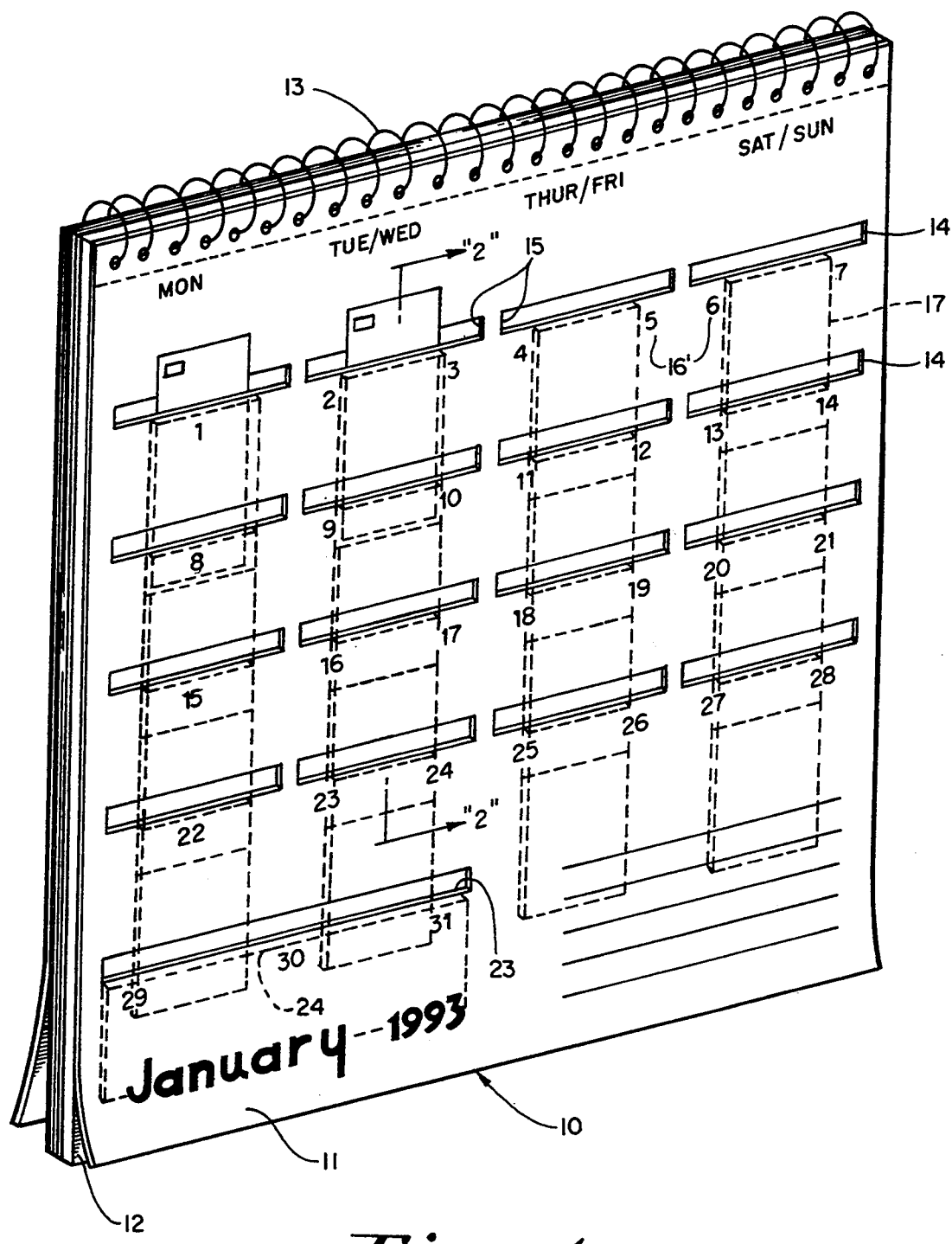
FIG. 1 is an perspective view of my calendar and mail sorting structure embodying important features of my invention.

According to my invention, I have developed a new and improved calendar and mail sorting structure which is indicated generally by the reference numeral 10. The structure 10 includes a series of monthly calendar sheets which under ordinary circumstances would be expected to include twelve calendar sheets. These sheets are indicated generally at 11. Cooperable with the sheets 11 is a bottom backing sheet member 12 which can be of a heavier thickness to provide a solid backing. The sheets 11 and 12 can be made of any suitable material including sturdy grades of paper. A conventional metal curve spiral binding 13 operates to connect the calendar sheets 11 and the sheet member 12 along an upper edge in assembly together. These sheets are loosely connected so that the monthly calendar sheets can be rotated about the binding 13 enabling each calendar sheet to be successively rotated into a front viewing position.

Each of these sheets 11 has series of rows of slots with the rows being indicated at 14 and the slots at 15. It will be seen that the rows 14 of the slots 15 are oriented so as to pass transversely through of the calendar sheets 11. The slots 15 are vertically and horizontally spaced from one another on each calendar sheet 11. Indicia or numbers 16' are mounted on a front side of each calendar sheet 11 in adjacency beneath each of the slots 15.

Mail supports or means are mounted on the calendar and mail supporting structure 10 between the bottom sheet member 12 and the current monthly calendar sheet 11 for supporting mail or envelopes 16 from behind the current monthly sheet when mail is inserted through the slots 15 from a front viewing position of the current monthly calendar sheet.

The mail supporting means comprising pockets or bags in the embodiment shown in FIG. 1 are indicated by the reference numeral 17 and are arranged in rows corresponding in number to the number of slots 15. The number of pockets 17 can be varied as shown in my other modifications. These pockets each have an upper open end 18 located immediately beneath the associated slot 15 to enable the envelope 16 to be sorted and deposited in a predetermined one of the pockets 15. The bag 17 has a bottom end 20 which supports a lower end of the envelope so that an upper end of the envelope will project through the slot and be located on a front side of the current monthly calendar sheet 11. As shown in FIGS. 1 and 2, the bottom end 20 of a bag 17 may overlap the upper open end 18 of another bag corresponding to a subsequent row of slots.

I have also provided a score line in adjacency to the binding 13 which score line is indicated at 21. The score lines are located along a top edge of each of the sheets 11 in adjacency to the binding 13 for enabling the sheets to be easily severed from the binding. This score line can be eliminated if the material used in the manufacture of the monthly calendar sheets is of such character that it can be readily torn from the binding 13 after the month has expired.

The bags or pockets 17 are secured by a suitable adhesive or fastener 22 (FIG. 2) to the backing sheet member 12 and can be used with the slots 15 on each of the monthly calendar sheets over the course of use for a given calendar year.

It will also be observed that in the lower left hand corner of each of the monthly calendar sheets 11, I have provided elongated slots 23. Behind the slots and mounted on the backing sheet 12 is an elongated pocket or bag 24. The slots 23 are provided so that bills to be paid in the last part of the month can be put in this elongated slot 23 and carried in the supporting pocket 24 by the backing sheet 12. Also, the bills that are to be carried over and paid in the following month can also be stored in this pocket.

In addition, to the right of the elongated slot 23 are a series of horizontal lines which provide a place where the user can place notes.

In FIG. 4, I have illustrated a modified type of a monthly calendar and mail sorting structure indicated generally at 25. This structure is very similar to the structure 10 except it is provided with rows 26 of elongated slots 27 for receiving envelopes 28 where the envelopes can be deposited so as to extend lengthwise in these slots 27 in such a way that the envelopes are supported in longitudinally elongated bags 29. The elongated bags 29 can be suitably attached to a front side of a heavier backing sheet 30 by adhesive or staples or other suitable means in the same manner shown in FIG. 2. The bags 29 have upper open ends for receipt of the envelopes 28 in the same way previously described. The bags are seized so that when the envelopes 28 are engaged against bottom edges 32 of the bags 29 that the envelopes 28 will protrude out through an open end of the slots 27 to be readily graspable by the user. In this embodiment, numerals 33 are differently oriented on each sheet member 31 than in the initial embodiment illustrated in FIGS. 1–3. Here, three days of each week are indicated by indicia or numbers 33 at the left hand side of each calendar sheet 31 beneath each slot 26. In contrast thereto, four sets of numerals 33 are located beneath the lower slot edge 34 on each row at the right hand side of the calendar sheet 31.

In FIGS. 5 and 6, I have illustrated still another form of my invention. Here a modified calendar structure 40 is illustrated. This structure is similar to the calendar structure 25 except that I have provided a different type of an envelope support in the form of angular channel shaped brackets 41. The supports 41 are generally shaped and include spaced upright legs 42 and 43. The supports 41 also have a bottom indicated at 44 and envelopes 45 are adapted to engage the support bottom 44 to support the envelope in such a way that it will protrude out through slot 46 in the front face of the calendar sheet 47. The legs 42 and 43 are preferably attached to an outside surface of backing sheet 47 behind monthly calendar sheet 48 by any suitable means 49 such as glue, which will be applied to the glue surface of the leg 42 to secure the leg 42 to backing sheet In FIG. 7, I have illustrated still another modified type of a monthly calendar and mail sorting structure marked with the number 50. The monthly calendar and mail sorting structure 50 differs from the ones shown in the other embodiments for here the means for supporting the envelopes 51 can either comprise bags of the type shown in FIGS. 1–3 or ledges defining channel shaped pockets for receiving the envelopes as shown in FIGS. 5 and 6. As illustrated, the envelope 51 projects through a single slot 52 rather than rows of slots for each week. In other words, one slot is provided for each week on each monthly calendar sheet 53. Each slot then has a series of numbers 54 which extend before a full week beneath a front edge of the slot 52. In this way, envelopes can be inserted into the slot 52 and supported by the mail supporting means indicated by the dotted line 55 to hold an upper end of the envelope so that it projects outwardly of the slot 52 on a front side of the monthly calendar sheet 53 with the days of that week being located immediately below a lower edge of the slot as shown at 54. In this embodiment, I have also provided a fifth row of numbers and slots so that if a month has more than 28 days that an added slot 52 is provided at the bottom. This added slot 52 can also be used to store mail to be carried over until the succeeding month for sorting and locating any appropriate slots provided on the next calendar sheet 53 which underlies the one shown and marked as January 1993. Summarizing, the envelopes supporting means 55 can either comprise bags or pockets and it may also comprise channel shaped support members as indicated at 41 in FIG. 6.

While the preferred form of the invention has been specifically illustrated and described herein, it will be apparent to those skilled in the art that modifications and improvements may be made to the form herein specifically disclosed. Accordingly, the present invention is not to be limited to the form herein specifically disclosed or in any other way inconsistent with the progress in the art promoted by this invention.

I claim:

1. A calendar and sorting structure comprising a series of calendar sheets joined to a single bottom sheet member by a binding along top edges of the calendar sheets and of the single bottom sheet member, and with the calendar sheets being rotatable on the binding enabling each calendar sheet to be successively rotated into a front viewing position, the calendar sheet rotated into the front viewing position, namely the current calendar sheet, having a front side facing the viewer and an opposed side facing the bottom sheet member, and the bottom sheet member having a front side facing the opposed side of the current calendar sheet, each of the calendar sheets having a series of rows of slots, indicia mounted on the front side of the calendar sheets in adjacency to the slots, and means for supporting time-sensitive material attached to the bottom sheet member and positioned between the bottom sheet member and the current calendar sheet whereby the time-sensitive material can be inserted through said slots of the current calendar sheet.

2. The calendar and sorting structure of claim 1 wherein score lines are provided along a top edge of each of the calendar sheets in adjacency to the binding for enabling the calendar sheets to be easily severed from the binding.

3. The calendar and sorting structure of claim 1 wherein the indicia provided on the front side of each of the calendar sheets are oriented relative to the slots in each row so that at least one day of each week is noted by indicia beneath each slot in each of the rows.

4. The calendar and sorting structure of claim 1 wherein an elongated slot is provided at a bottom corner of each calendar sheet and means for supporting time-sensitive material is attached to the bottom sheet member and positioned between the bottom sheet and the current calendar sheet in adjacency to the elongated slot for receiving envelopes for storing them for the succeeding month.

5. The calendar and sorting structure of claim 1 wherein a series of vertically spaced horizontal lines are provided on each of the calendar sheets for receipt of written notes.

6. The calendar and sorting structure of claim 1 wherein the means for supporting time-sensitive material comprises a ledge located between the bottom sheet member and the current calendar sheet, the ledge being positioned on the front side of the bottom sheet member, and thereby supporting the time-sensitive material extended through one or more of the slots.

7. The calendar and sorting structure of claim 1 wherein the means for supporting time-sensitive material comprises a series of bags attached to the front side of the bottom sheet member, each bag having an upper open end located just beneath an associated one of the slots, the bags being shaped and arranged for receiving and supporting time-sensitive materials manually inserted through the slots.

8. The calendar and sorting structure of claim 1 wherein means is provided for attaching the means for supporting time-sensitive material to the front side of said bottom sheet member immediately below said slots.

9. The calendar and sorting structure of claim 8 wherein the means for supporting time-sensitive material comprises a series of bags each having an upper open end located just beneath one or more associated slot, the bags being shaped and arranged for receiving time-sensitive material when inserted into the slots as they are manually inserted through the slots and then supported in the bags beneath the slots at a rear side of the current calendar sheet.

10. The calendar and sorting structure of claim 1 wherein the number of slots in the rows is at least one.

11. A calendar and sorting structure comprising
a single bottom sheet member, the bottom sheet member having a front side, a rear side and an upper edge; and
a series of calendar sheets, the calendar sheets having a front side, a rear side and an upper edge, the series of calendar sheets being joined to the bottom sheet member by a binding along one edge of the calendar sheets and along a corresponding edge of the bottom sheet member;
each calendar sheet being individually rotatable on the binding; the calendar sheets being ordered on the binding so that each calendar sheet can be successively rotated into a front viewing position, the front viewing position being characterized in that the rear side of the calendar sheet rotated into the front viewing position faces the front side of the single bottom sheet member;
each calendar sheet containing a series of slots positioned in horizontally spaced rows which transversely pass over the calendar sheet, the slots being placed on all calendar sheets of the series of calendar sheets at the same positions; and
means for supporting time-sensitive material attached to the front side of the single bottom sheet member and placed relative to the position of the slots in the calendar sheets so that time-sensitive materials of predetermined size which are introduced through the slots of the calendar sheet rotated into the front viewing position are supported by said means positioned between the rear side of the calendar sheet rotated into the front viewing position and the front side of the bottom sheet member, the means for supporting time-sensitive material being adjacent to the rear side of the calendar sheet rotated into the front viewing position without being attached to said calendar sheet.

12. The calendar and sorting structure according to claim 11 wherein the means for supporting time-sensitive material consists of ledges that are each positioned adjacent to and beneath and thus associated with a slot on the calendar sheet rotated into the front viewing position.

13. The calendar and sorting structure according to claim 12 wherein the ledges are angular channel shaped brackets.

14. The calendar and sorting structure according to claim 11 wherein the means for supporting time-sensitive material consists of a plurality of bags having an open upper end and a closed lower end, the bags being attached to the front side of the bottom sheet member and the open upper end of the bags being placed so that the bags can receive and hold said time-sensitive materials inserted into the bags, the upper open end of each bag being placed beneath and thus associated with a slot in the calendar sheet rotated into the front viewing position.

15. The calendar and sorting structure according to claim 14 wherein the bags are sized so that a predetermined portion of said time-sensitive materials of predetermined size can be inserted through the slots in the calendar sheet rotated into the front viewing position and slip into the bag associated with each slot.

16. A calendar and sorting structure according to claim 12 or 14 wherein the ledges or bags are positioned in a partially overlapping way on the front side of the bottom sheet member so that portions of two different ledges or bags associated with slots on different rows might cover the same portion of the front side of the bottom sheet member.

17. A calendar and sorting structure according to claim 11 wherein a multitude of slots are positioned in each horizontally spaced row.

18. A calendar and sorting structure according to claim 11 wherein only a single slot is positioned in each horizontally spaced row.

19. A calendar and sorting structure according to claim 14 wherein the bottom sheet member is made of a sturdy paper.

20. A calendar and sorting structure according to claim 19 wherein the bags attached to the front side of the bottom sheet member are made of a light weight material, the bags being fixed to the front side of the bottom sheet member by an adhesive.

21. A calendar and sorting structure according to claim 19 wherein the bags attached to the front side of the bottom sheet member are made of a light weight material, the bags being fixed to the front side of the bottom sheet member by staples.

* * * * *